United States Patent
Laubach

[15] 3,695,059
[45] Oct. 3, 1972

[54] ADJUSTABLE TORQUE LIMITING COUPLING

[72] Inventor: Wilburn B. Laubach, 5718 Wellington Drive, Austin, Tex. 78723

[22] Filed: Jan. 14, 1971
[21] Appl. No.: 106,348

[52] U.S. Cl. ..................................64/29, 81/52.4 A
[51] Int. Cl. ..............................................F16d 7/06
[58] Field of Search............64/29, 30, 28; 81/52.4 X

[56] References Cited

UNITED STATES PATENTS

| | | | |
|---|---|---|---|
| 2,983,121 | 5/1961 | Naas | 64/29 |
| 3,441,115 | 4/1969 | Gunther | 64/29 X |
| 3,068,667 | 12/1962 | Sussman | 64/29 |

*Primary Examiner*—Edward G. Favors
*Attorney*—Shlesinger, Arkwright & Garvey

[57] ABSTRACT

An adjustable torque limiting coupling including a driving member, a driven member, an intermediate member and a housing for the driving, driven and intermediate members. The intermediate member is coupled with the driven member so as to accommodate relative axial motion and prevent relative rotation between the driven member and the intermediate member. The intermediate member includes a disc like portion having a plurality of pairs of radially disposed, diametrically opposed recesses in the face of the disc like portion for engaging in yieldable driving relationship a member projecting from the driving member. Adjustable spring means is provided for urging the recesses and projecting member into yieldable driving relationship, and means for adjusting the spring means and locking the adjustment of the spring means is provided.

15 Claims, 4 Drawing Figures

PATENTED OCT 3 1972 3,695,059

Inventor
Wilburn B. Laubach

ADJUSTABLE TORQUE LIMITING COUPLING

This invention relates to an adjustable torque limiting coupling, and more particularly, to an adjustable torque limiting coupling for use with conventional socket type wrenches and associated attachments.

In many phases of industry, there is a great need for precise instruments for indicating the torque applied to various fasteners such as bolts, screws and the like. Over tightening of these fasteners can result in premature wear or stripping of the threads of the fastener, and under tightening of the fastener can cause it to vibrate loose with resultant possible damage to the machine parts to which the fastener is applied.

Many types of devices have been proposed in the prior art for tightening this type of fastener to a precise value, and torque wrenches are frequently used for this purpose. However, many torque wrenches depend to a great extent upon the skill of the user.

Also, various couplings or adaptors have been proposed for use between a wrench and the socket utilized for tightening the fastener. Many of these prior art devices have included slip type clutches which release when the torque reaches a predetermined value, however, many of these releasable type torque measuring devices have suffered from a lack of repeatability or precision in their use and means for calibration.

Therefore, a primary object of this invention is to provide an adjustable torque limiting coupling which overcomes the disadvantages of the prior art.

Another object of this invention is to provide a torque limiting device arranged in an adaptor and including new features for improving the workability of the detachable coupling.

Still another object of this invention is to provide a torque limiting coupling which may be utilized with standard wrenches, sockets, and power assist wrenches.

A further object of this invention is to provide an adjustable torque limiting coupling with a quick release torque setting lock mechanism which is operable throughout the entire range of torque of the adaptor.

Still another object of this invention is to provide adjustable torque limiting coupling with a positive lock for the torque setting and the calibration of the setting.

Still a further object of this invention is to provide an adjustable torque limiting coupling with means for preventing foreign matter from entering the coupling and affecting the operation of the device.

Yet a further object of this invention is to provide a torque limiting coupling which may be sealed to prevent tampering of the calibration thereof.

Yet another object of this invention is to provide a torque limiting coupling which is operable with equal precision in either direction of rotation.

These and other objects and advantages of this invention will become apparent when considered in light of the following description and claims when taken together with the drawings in which:

DESCRIPTION OF THE INVENTION

Figure 3:
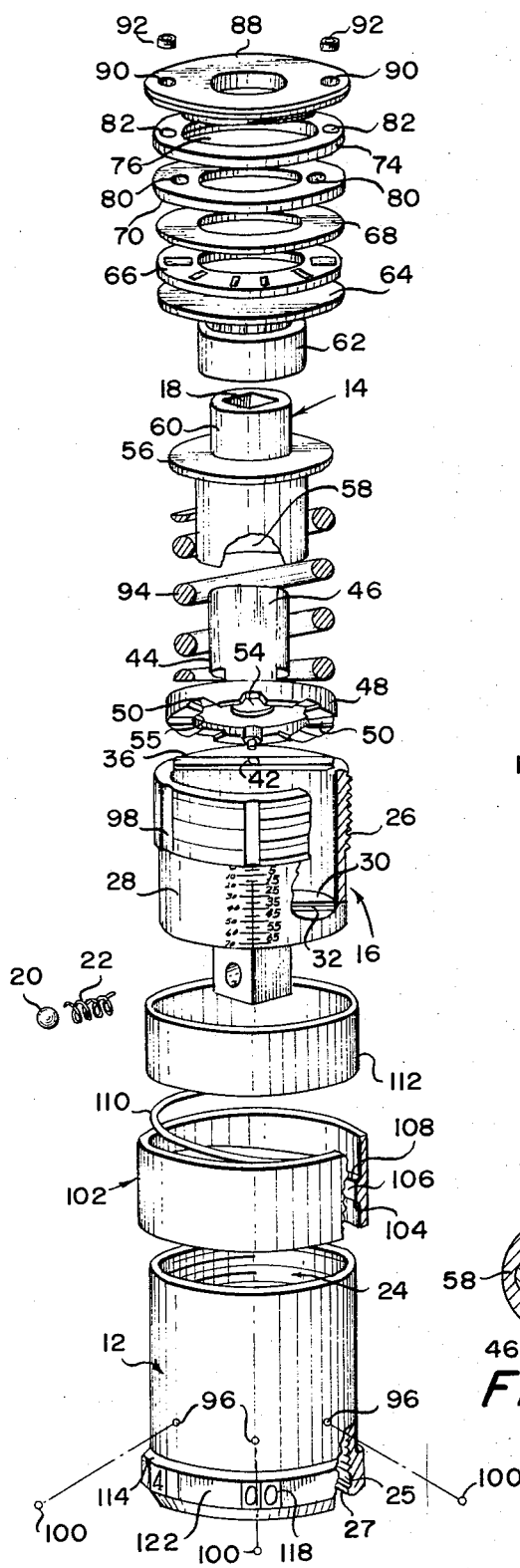
FIG. 3 is an exploded view of the coupling of this invention.
Figure 1:
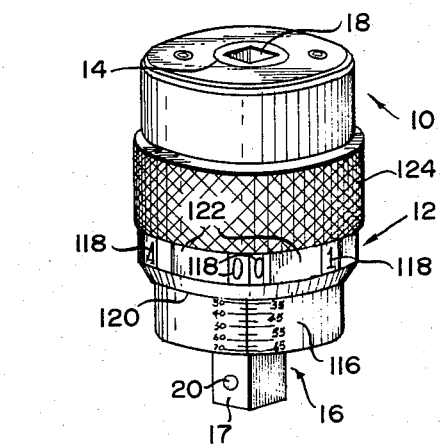
FIG. 1 is a perspective view of the coupling of this invention.

With reference now to FIG. 1, the coupling generally designated 10 is seen to include a generally tubular housing 12 having a driven member 14 and a driving member 16. The driven member 14 is seen to have a square opening 18, but opening 18 could be of other cross sectional configuration such as hexagonal, for use with various types of hand or power driven wrenches. Recesses REcesses 19 are provided in the sides of opening 18 to permit frictional retention of the coupling 10 on the driving member of a wrench (not shown) having a ball detent in a manner known in the art. Also, the driving member 16 is seen to have a square driving projection 17, but it also could have a different cross sectional configuration such as hexagonal or the like or have screw driving shapes. The driving member 16 includes a ball 20 provided in a bore in the driving member 16, and biased outwardly by means of a spring 22. The spring biased ball 20 serves to retain socket members on the driving member 16 in a manner known in the art.

Figures 2, 4:
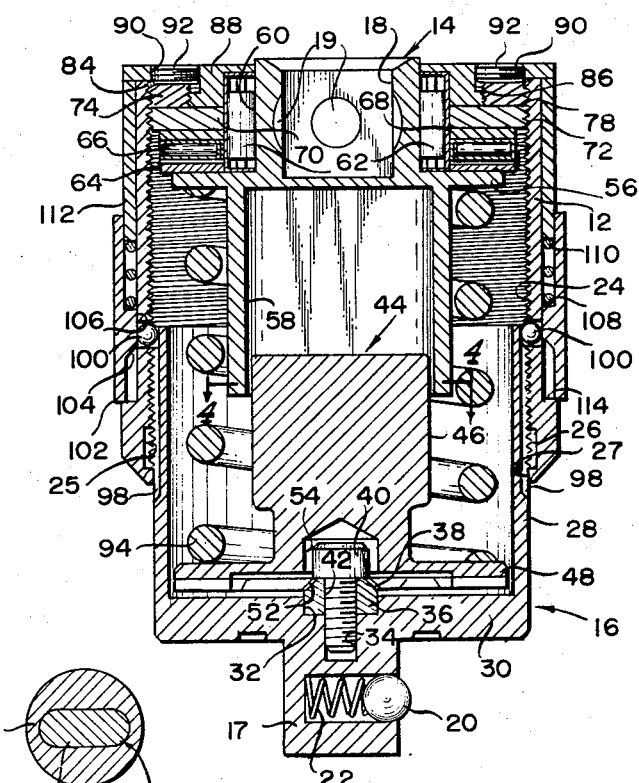
FIG. 2 is a longitudinal sectional view of the coupling.
FIG. 4 is a view along lines 4—4 of FIG. 2 and viewed in the direction of the arrows.

Referring now to FIG. 2, housing 12 is seen to have female threads 24 therein. These threads 24 engage male threads 26 on the tubular portion 28 of the driving member 16.

Threads 24 are interrupted as at 25, and an annular shoulder 27 is provided at the lower end of housing 12 to prevent driving member 16 from being threaded entirely through housing 12 by means of the thusly provided interference between threads 26 and shoulder 27. Positioned within the closed end 30 of tubular portion 28 is a recess 32 and a threaded bore 34. Positioned within recess 32 is an elongated bar 36 having tapered side surfaces 38. Bar 36 is retained within recess 32 by means of a bolt 40 passing through bore 42 in bar 36 and threaded into bore 34. Thus, bar 36 is constrained against movement with respect to driving member 16.

An intermediate member 44 is seen to include a portion 46 which preferably has the cross sectional configuration seen in FIG. 4 but may also be elliptical, square, hexagonal, etc.

Intermediate member 44 has at its lower end a disc like portion 48, and includes in the face of this disc like portion 48 a plurality of pairs of diametrically opposed radially disposed recesses 50. Recesses 50 include tapered side surfaces 52 shaped so as to complement surfaces 38 of bar 36. In this manner, bar 36 engages any pair of diametrically opposed recesses 50, and bore 54 in intermediate member 44 is provided to permit clearance over bolt 40, while the recess 55 permits clearance between bar 36 and intermediate member 44 other than at recesses 50.

Driven member 14 is seen to include a disc like flange 56, and a tubular portion 58, having a non-circular internal configuration, and extending downwardly from flange 56. Tubular portion 58 preferably has a circular outer configuration and the internal cross sectional configuration seen in FIG. 4, but the internal configuration may be of any non-circular cross sectional configuration such as elliptical, square, hexagonal or the like but must be of a shape complementary to portion 46 of the intermediate member 44. In this manner, the intermediate member 44 is free to move axially within tubular portion 58, but may not rotate with respect to the tubular portion 58 for drive connection purposes.

The means by which the driven member 14 is positioned within the housing 12 will now be described. Driven member 14 includes an upstanding tubular hub-like portion 60 which is shown projecting upwardly slightly above the upper edge of the housing 12. A roller bearing 62 is positioned around the tubular portion 60, and the thrust washer 64 is mounted around bearing 62 and positioned against flange 56. Also positioned around bearing 62 and against thrust washer 64 is a thrust bearing 66. On the upper side of thrust bearing 66 is an additional thrust washer 68. Thrust washer 64 and 68 and thrust bearings 66 are of such a diameter that they do not contact at all the threads 24 of housing 12. Bearings 62 and 66 permit low friction rotation between the outer stationary members of coupling 10 and the inner rotating members when the coupling is in use at the torque limit for tightening a bolt or object.

A flat washer 70 is positioned around the bearing 62 and has male threads 72 for threaded engagement with threads 24 of housing 12. Washer 70 may be rotated to adjust and calibrate the coupling 10. Another washer 74 includes a threaded central opening 76 and a threaded outer surface 78 for engagement with threads 24 of housing 12 for locking washer 70 in place and thus locking the calibration of the coupling 10. Washers 70 and 74 have diametrically opposed holes 80 and 82 respectively for engagement with a suitable spanner wrench (not shown) for tightening of the washers 70 and 74 in the housing 12. A suitable anti-tampering seal 84 is provided between washer 74 and housing 12. The seal 84 may be a bead of wax or plastic or other suitable material which would be broken if washer 74 is rotated with respect to housing 12. This would enable a visual inspection to determine if the calibration of the coupling 10 has been altered, and would also permit certification of the accuracy of coupling 10.

Bore 76 in washer 74 is provided with female threads 86 which secure cover member 88 to washer 74. Cover 88 also includes a pair of holes 90 which are used with a suitable spanner wrench (not shown) for tightening the cap to washer 74 and are also threaded to receive screws 92 in order to further secure cover 88 to washer 74 and to the housing 12.

A coil compression spring 94 is shown surrounding the tubular portion 58 of driven member 14 and the portion 46 of intermediate member 44, and bearing against flange 56 of driven member 14 and against disc like portion 48 of the intermediate member 44. Spring 94 tends to urge bar 36 and recesses 50 in engagement. By screwing the tubular portion 28 of driving member 16 into or out of housing 12, the compression of spring 94 may be varied, and accordingly, the forces holding bar 36 and recesses 50 in engagement may be varied.

Housing 12 is seen to include a plurality of holes 96 passing therethrough. Additionally, threads 26 of driving member 16 are seen to include a plurality of longitudinally extending interruptions or recesses 98. Positioned within holes 96 are a plurality of ball detents 100. Balls 100 are of a diameter such that they may engage both the recesses 98 and the housing 12, thus preventing relative rotation of housing 12 and driving member 16. Positioned around housing 12 is a lock ring 102 which includes on its inner surface a cam surface 104 and a flat surface 106. Flat surface 106 is arranged so as to provide a shoulder 108. Resting on shoulder 108 is a coil spring 110. Spring 110 is retained in position about housing 12 by means of a retaining ring 112. Lock ring 102 is arranged so that it may be moved axially, overlapping the retaining ring 112, or in the opposite direction so as to abut shoulder 114 of housing 12.

When lock ring 102 is moved upwardly as seen in FIG. 2, ball detents 100 may move radially outwardly, permitting relative rotation of driving member 16 and housing 12 for adjusting the compression of spring 94. When lock ring 102 is released, the cam surface 104 forces ball detents 100 radially inwardly so as to engage recesses 98 and prevent further rotation of driving member 16 with respect to housing 12. Thus, when the compression of spring 94 is set, it is positively locked in that position until it is desired to change the setting in the aforementioned manner. By varying the compression of spring 94, and thusly the force engaging bar 36 in recesses 50, the torque limit of the coupling 10 may be adjusted. Thus in operation, as the fastener or bolt (not shown) is tightened, a positive connection will be had between driven member 14 and driving member 16. However, when the predetermined torque value is reached, disc like portion 48 of intermediate member 44 will be disengaged from the driving member 16 by means of the cooperating tapered surfaces 38 and 52. In this manner, an audible click will be produced, indicating that the preset torque limit has been reached, and the fastener may not be overtightened.

On the exterior surface of driving member 16 is provided indicia 116, and on the exterior surface of housing 12 is provided indicia 118. With reference to FIG. 1, the torque value set in the coupling 10 is seen to be "30" as indicated by the usual manner of reading micrometer type dials. That is, edge 120 of housing 12 is seen to line up with the indicia marked "30" on the driving member 16, and the indicia "0" on the housing 12 is indexed as seen in FIG. 1. In order to provide graduations of one unit of torque on the coupling, five equally spaced recesses 98 are provided, and indicia 118 ranges from zero to 4. Indicia 116 is divided into units of five. It is obvious that other relationships can be devised to provide greater or lesser calibrations of the torque value set into the coupling.

If desired, flats 122 may be provided for engagement by a conventional box end wrench (not shown) for assisting in adjusting the pre-determined torque value of the coupling. Also, lock ring 102 may have a knurled surface as indicated at 124.

To assure precision and repeatability in the coupling 10, housing 12, driven member 14, driving member 16, bar 36, intermediate member 44, roller bearing 62, thrust washers 64 and 68, thrust bearing 66, washer 70 and 74, and ball detents 20 and 100 all have hardened, wear resistant surfaces. Additionally, the surfaces may be plated for corrosion resistance.

The torque limit of the coupling 10 is a function of the pitch of threads 24 and 26, the spring rate of spring 94, the slope of tapered surfaces 38 and 52, the diametrical distance between the contact points of tapered surfaces 38 and 52, and the calibration of the indicia. Thus, changing of any of these factors may change the calibration of the coupling 10 for various units of torque such as foot-pounds, inch-pounds or any metric units of torque.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. An adjustable torque limiting coupling including:
   a. a driving member,
   b. a driven member,
   c. an intermediate member,
   d. a housing for said driving, driven, and intermediate members,
   e. said intermediate member being telescopically coupled with said driven member so as to accommodate relative axial motion and prevent relative rotation between said driven member and said intermediate member,
   f. said intermediate member including a disc-like portion having a plurality of pairs of radially disposed diametrically opposed recesses in the face of said disc-like portion,
   g. said driving member including a member projecting therefrom for engaging a pair of said diametrically opposed recesses in yieldable driving relationship,
   h. adjustable spring means for urging said pair of diametrically opposed recesses and said projecting member into yieldable driving relationship,
   i. means for adjusting said adjustable spring means, and
   j. means for locking the adjustment of said adjustable spring means.

2. An adjustable torque limiting coupling as in claim 1 and wherein:
   a. said projecting member comprises an elongated bar having tapered side surfaces, and
   b. said recesses have tapered side surfaces complementing said side surfaces of said bar.

3. An adjustable torque limiting coupling as in claim 2 and wherein:
   a. said driving member includes a tubular threaded portion,
   b. said housing includes a threaded portion for threadedly engaging said tubular threaded portion,
   c. means for operatively connecting said threaded portion with said driven member,
   d. whereby upon relative rotation of said housing and said driving member, the compression of said spring means is adjusted.

4. An adjustable torque limiting coupling as in claim 3 and wherein:
   a. said connecting means includes thrust bearing means and roller bearing means, and
   b. means for securing said thrust bearing means and said roller bearing means within said housing.

5. An adjustable torque limiting coupling as in claim 4 and wherein:
   a. said housing includes a plurality of radially spaced apertures,
   b. a plurality of longitudinally extending recesses formed in said tubular threaded portion,
   c. ball detents positioned in said apertures and movable into and out of engagement with said recesses,
   d. means for releasably holding said ball detents in engagement with said recesses,
   e. thereby preventing relative rotation between said housing and said driving member.

6. An adjustable torque limiting coupling as in claim 5 and wherein:
   a. said releasable holding means includes ring means having holding and release positions and surrounding said housing,
   b. said ring means including an annular cam surface for forcing said ball detents toward said driving member upon axial movement of said ring means, and
   c. a holding surface for holding said ball detents in engagement with said recesses.

7. An adjustable torque limiting coupling as in claim 6 and including:
   a. spring means for biasing said ring means in said holding position.

8. An adjustable torque limiting coupling as in claim 1 and including:
   a. first indicia means on said driven member,
   b. second indicia means on said housing,
   c. said first and second indicia means cooperating so as to provide an indication of the torque adjustment of said coupling.

9. An adjustable torque limiting coupling as in claim 7 and wherein:
   a. said thrust bearing means is positioned around said roller bearing means, and
   b. said means for securing said roller bearing means and thrust bearing means in said housing includes lock washer means.

10. An adjustable torque limiting coupling as in claim 9 and including:
    a. frangible seal means operatively associated with said lock washer means and said housing,
    b. whereby upon disturbing said lock washer means results in rupture of said frangible seal means.

11. An adjustable torque limiting coupling as in claim 3 and wherein:
    a. said tubular threaded portion of said driving member is substantially cup shaped.

12. An adjustable torque limiting coupling as in claim 1 and wherein:
    a. said driven member includes a hollow sleeve-like portion having an internal cross sectional configuration including at least one substantially straight portion,
    b. said intermediate member includes a hub-like projection having an external cross sectional configuration complementing the cross sectional configuration of said sleeve like portion and being telescopically positioned therein,
    c. whereby said at least one substantially straight portion on each of said sleeve-like portion and said hub-like projection prevents relative rotation and permits relative axial motion between said driven member and said intermediate member.

13. An adjustable torque limiting coupling as in claim 12 and wherein:

a. said internal and external cross sectional configurations are substantially oval.

14. An adjustable torque limiting coupling as in claim 12 and wherein:
   a. said internal and external cross sectional configurations are substantially square.

15. An adjustable torque limiting coupling as in claim 12 and wherein:
   a. said internal and external cross sectional configurations are substantially hexagonal.

* * * * *